(12) United States Patent
Wolfgram et al.

(10) Patent No.: US 10,609,904 B2
(45) Date of Patent: Apr. 7, 2020

(54) LURE CHASING SYSTEM

(71) Applicants: Meghan Wolfgram, Malabar, FL (US); John Ritter, Satellite Beach, FL (US)

(72) Inventors: Meghan Wolfgram, Malabar, FL (US); John Ritter, Satellite Beach, FL (US)

( * ) Notice: Subject to any disclaimer, the term of this patent is extended or adjusted under 35 U.S.C. 154(b) by 0 days.

(21) Appl. No.: 14/569,715

(22) Filed: Dec. 14, 2014

(65) Prior Publication Data

US 2015/0201586 A1    Jul. 23, 2015

Related U.S. Application Data

(60) Provisional application No. 61/917,058, filed on Dec. 17, 2013.

(51) Int. Cl.
*A01K 15/02* (2006.01)

(52) U.S. Cl.
CPC ................................. *A01K 15/025* (2013.01)

(58) Field of Classification Search
CPC .... A01K 15/025; A01K 15/027; A01M 31/06
USPC ................... 119/701, 702, 707, 708; 43/2, 3
See application file for complete search history.

(56) References Cited

U.S. PATENT DOCUMENTS

| | | | | |
|---|---|---|---|---|
| 3,965,866 A * | 6/1976 | Lorentz | ................ | A01K 15/027 119/704 |
| 4,018,189 A * | 4/1977 | Umphries | ............ | A01K 27/004 119/794 |
| 4,197,817 A * | 4/1980 | Crutchfield | .......... | A01K 27/004 119/794 |
| 4,656,967 A * | 4/1987 | Duksa | ..................... | A01K 1/04 119/703 |
| 4,738,223 A * | 4/1988 | Andreasen | ........... | A01K 15/027 119/839 |
| 5,806,465 A * | 9/1998 | Baiera | .................. | A01K 15/025 119/707 |
| 6,311,425 B1 * | 11/2001 | Capps | ................... | A01M 31/06 43/3 |
| 6,318,302 B1 * | 11/2001 | Bedient | .................... | A01K 1/04 119/786 |
| 6,405,683 B1 * | 6/2002 | Walter | ................. | A01K 27/004 119/772 |
| 6,571,742 B1 * | 6/2003 | Tsengas | ............... | A01K 15/025 119/707 |
| 7,131,401 B2 * | 11/2006 | Huff | ..................... | A01K 27/004 119/794 |
| 7,614,626 B1 * | 11/2009 | Aanerud | .................... | F41J 9/02 273/366 |
| 7,823,541 B2 * | 11/2010 | Comerford | .......... | A01K 15/025 119/707 |
| 2009/0007854 A1 * | 1/2009 | Cooper | ................ | A01K 15/025 119/707 |
| 2010/0077648 A1 * | 4/2010 | Tucker, Jr. | ............ | A01M 31/06 43/3 |

(Continued)

*Primary Examiner* — Lisa L Tsang (74) *Attorney, Agent, or Firm* — Stephen C. Thomas; Joseph Stecewycz (57) ABSTRACT

A lure chasing system comprises: a motorized pulley unit disposed at a first location, the motorized pulley unit including a drive housing enclosing a motor and a drive pulley connected to the motor; a transfer pulley unit disposed at a second location, the transfer pulley unit including a transfer housing enclosing a transfer pulley; a lure line engaging the drive pulley and the transfer pulley so as to form a loop configuration for the lure line; and a lure attached to the lure line.

20 Claims, 5 Drawing Sheets

(56) References Cited

U.S. PATENT DOCUMENTS

| | | | |
|---|---|---|---|
| 2012/0073180 A1* | 3/2012 | Elliott | A01M 31/06 43/3 |
| 2012/0227677 A1* | 9/2012 | Rutherford | A01K 15/027 119/704 |
| 2015/0027029 A1* | 1/2015 | Mager | A01M 31/06 43/2 |

* cited by examiner

LURE CHASING SYSTEM

CROSS REFERENCE TO RELATED APPLICATION

The present Application is related to Provisional Patent Application entitled "Lure Chasing System," filed 17 Dec. 2013 and assigned filing No. 61/917,058, incorporated herein by reference in its entirety.

FIELD OF THE INVENTION

The present invention relates to a system and method for propelling a lure along a user-designed line course and, more particularly, to a system for controlling movement of a lure to provide an incentive for running animals along the line course.

BACKGROUND OF THE INVENTION

Do it yourself lure chasing is an exciting new activity that provides exercise and enjoyment for animals, namely dog pets. Lure chasing involves setting up a course with a line that has attached to it a lure. The lure is typically one that catches the attention of the animal as it moves. The line is typically a closed loop system that is cooperative with a motor that causes the line to move thereby moving the lure.

The inventors have discovered that there are inherent operational problems and risks associated with conventional lure chasing systems. For example, existing lure chasing systems utilize open pulley systems that require the use of cables or ropes having a substantial weight, thickness, and/or tensile strength. These systems can injure the mouth or limbs of a dog should the dog fall down or stumble.

In addition, the open pulley systems typically used in conventional systems are prone to misalignment or failure when any turbulence is encountered in the line, which is actually quite frequent. Another main concern of conventional lure chasing systems is that the line is of such a high resiliency that the line will cause burns or trauma to the animals if the animal is accidentally caught in the line.

BRIEF SUMMARY OF THE INVENTION

In one aspect of the present invention, a lure chasing system comprises: a motorized pulley unit disposed at a first location, the motorized pulley unit including a drive housing enclosing a motor and a drive pulley connected to the motor; a transfer pulley unit disposed at a second location, the transfer pulley unit including a transfer housing enclosing a transfer pulley; a lure line engaging the drive pulley and the transfer pulley so as to form a loop configuration for the lure line; and a lure attached to the lure line.

In another aspect of the present invention, a lure chasing system comprises: a drive housing enclosing a motor and a drive pulley connected to the motor, the drive housing including a drive cover and a drive base, the drive cover secured to the drive base with a hinge and with a hook and pile fastener; a transfer housing enclosing a transfer pulley, the transfer housing including a transfer cover and a transfer base, the transfer cover secured to the transfer base with a hinge and with a hook and pile fastener; a lure line engaging the drive pulley and the transfer pulley so as to form a loop configuration of the lure line; and a lure attached to the lure line.

The additional features and advantage of the disclosed invention is set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

For the purposes of promoting an understanding of the principles and operation of the present invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

The present invention relates generally to a lure chasing system which prevents or mitigates injury to an animal enjoying the lure chasing system. The lure chasing system comprises a motorized pulley unit that includes a motor secured in a motorized pulley housing, the motorized pulley housing having a housing cover that can be hingedly detached from a base and the housing thus opened. The housing cover and housing base each have an annular recess for accommodating a drive pulley. The drive pulley is secured within the annular recesses when the housing cover is closed, enabling the motor to safely rotate the motor unit pulley.

The lure chasing system also includes at least one transfer pulley unit, located at a distance from the motorized pulley unit, for guiding and keeping a lure line under tension. The transfer pulley unit includes a transfer pulley housing with a cover hingedly attached to a base. The transfer pulley housing cover and base similarly have respective annular recesses configured to accommodate a transfer pulley. The lure line is used to quickly pull along a lure that can be chased by a running animal, such as a dog.

Figure 1:
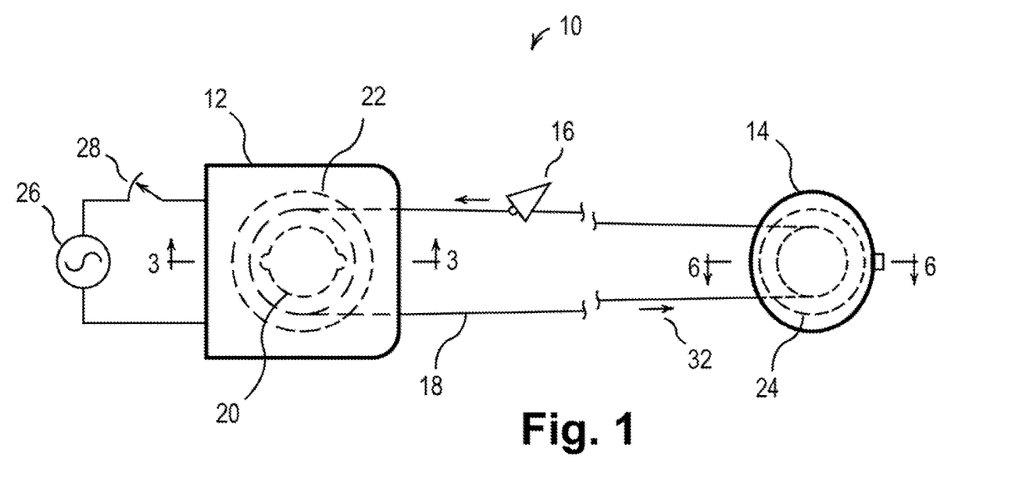
FIG. 1 is a diagrammatical top view illustration of a basic powered line course including a motorized pulley unit and a transfer pulley unit, in accordance with an aspect of the present invention.

There is shown in FIG. 1 a diagrammatical top view illustration of a basic powered line course 10 suitable for use in exercising dogs and similar animals accustomed to running, in accordance with an aspect of the present invention. The basic powered line course 10 comprises a motorized pulley unit 12 disposed at a first location, a lure line 18, a lure 16, and a transfer pulley unit 14 disposed at a second location. The motorized pulley unit 12 is placed on the ground and is separated from the transfer pulley unit 14 (also placed on the ground) by a distance determined by the user. The lure line 18 is routed through the motorized pulley unit 12 and through the transfer pulley unit 14 to form a closed loop, essentially as shown.

The lure 16 is removably attached to the lure line 18, at a location selected by the user. The lure line 18 is configured into a closed loop, such as by knotting a length of line, so that the lure line 18 passes around both: (i) a drive pulley 22 secured in the motorized pulley unit 12, and (ii) a transfer pulley 24 secured in the transfer pulley unit 14.

The motorized pulley unit 12 includes a motor 20 that is preferably powered by an external AC electrical source 26, and controlled by an electrical speed and direction control 28. Alternatively, a DC battery can be provided as a source of electrical power. The motor 20, which may be reversible, is used to rotate the drive pulley 22, which frictionally engages and pulls along the lure line 18, as indicated by the arrows 32. When the motor 20 is operating, and the lure line 18 is frictionally engaged by both the drive pulley 22 and the transfer pulley 24, the lure 16 is transported by the lure line 18 and provides an attractive moving target for a dog, for example, which may then give chase. The lure line is preferably a plastic line, and may be fabricated in a monofilament configuration or as an aggregate of monofilament lines in a stranded configuration.

Figure 2:
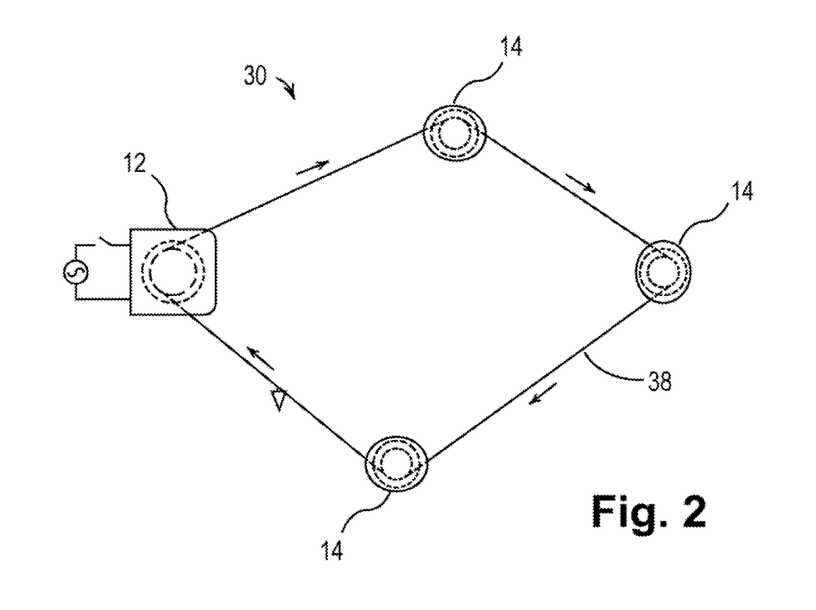
FIG. 2 is a diagrammatical top view illustration of an alternative powered line course including the motorized pulley unit of FIG. 1 and three transfer pulley units.

FIG. 2 is a diagrammatical top view of an alternative configuration of a powered line course 30, in accordance with another aspect of the present invention. The powered line course 30 comprises the motorized pulley unit 12, a lure line 38 forming a continuous loop, the lure 16 attached to the lure line 38, and three transfer pulley units 14 engaging the lure line 38. The lure line 38 is routed through the motorized pulley unit 12 and through each of the three transfer pulley units 14 to form a closed loop. The length of the lure line 38 may be longer or shorter than the length of the lure line 18 in the above configuration of FIG. 1. In the example shown, the motorized pulley unit 12 and the three transfer pulley units 14 form the vertices of a four-sided polygon. It should be understood that the components of the powered line course 30 can be arranged in any pattern desired by the user, provided that there is space and terrain available to set up the powered line course 30.

As explained in greater detail below, the exemplary powered line courses 10, 30 are designed to propel the lure 16 along the respective course without causing binding of the lure 16 inside the motorized pulley unit 12 or in any of the transfer pulley units 14. The powered line courses 10, 30 are further designed to prevent the inadvertent entanglement of an animal: (i) in the lure lines 16, 38, (ii) in the motorized pulley unit 12, or (iii) in any of the transfer pulley units 14.

As an added safety measure, the lure line 18, 38 is preferably fabricated from a plastic material having a melting point that causes the lure line 18, 38 to soften and break from heat generated from persistent slippage on the inner surface of either the drive pulley 22 or the transfer pulley 24. This feature causes the lure line 18, 38 to break if, for example, a foreign object lodges in one of the components of the powered line courses 10, 30 and prevents free movement of the respective lure line 18, 38 while the motorized pulley unit 12 is operating. In an exemplary embodiment, the lure line 18, 38 may comprise a stranded or braided nylon string, size #18, having a tensile strength of from about 50 to 170 pounds.

Figure 3:
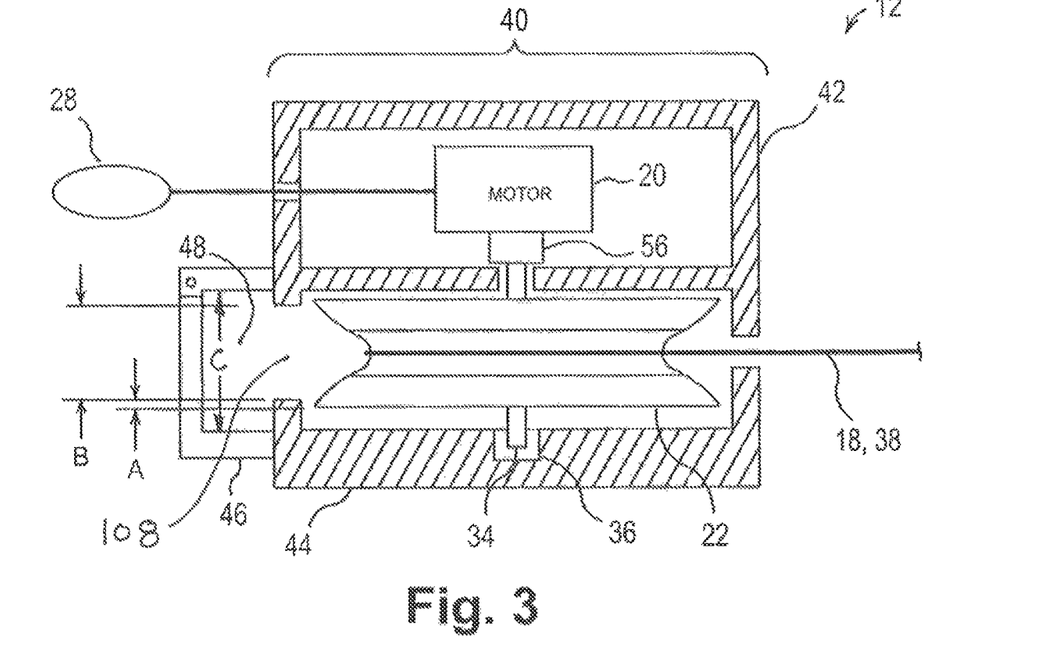
FIG. 3 is a cross-sectional diagrammatical view of the motorized pulley unit of FIG. 1 in a closed configuration.
Figure 4:
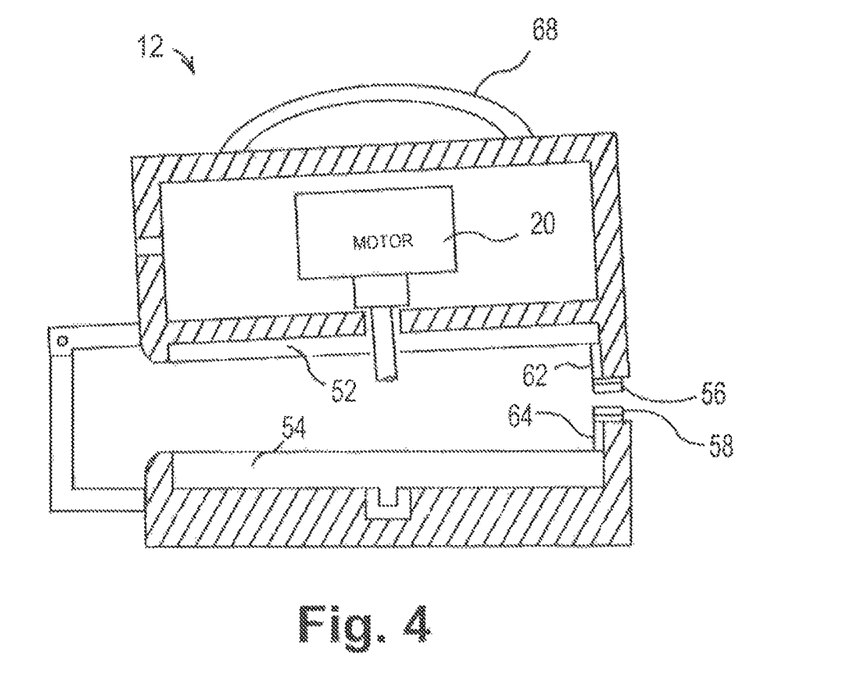
FIG. 4 is a cross-sectional diagrammatical view of the motorized pulley unit of FIG. 1 in an opened configuration.

FIGS. 3 and 4 are diagrammatical cross-sectional views of the motorized pulley unit 12, as defined by the sectional arrows 3-3 in FIG. 1. The motorized pulley unit 12 comprises the motor 20 and the drive pulley 22 mounted in a motorized unit housing 40. The motorized unit housing 40 includes a cover 42 hingedly connected to a base 44 by a hinge 46. The motorized unit housing 40 may be fabricated from a plastic material to minimize weight. In an exemplary embodiment, the drive pulley 22 is fabricated from a PVC plastic material to minimize rotational inertia.

The motor 20 engages the drive pulley 22 via a drive shaft 34. When the motorized unit housing 40 is in a closed configuration, as shown in FIG. 3, the drive shaft 34 may be retained in a socket or bearing 36 to provide stability and support to the drive pulley 22. In an exemplary embodiment, the motorized pulley unit 12 may include an optional clutch 70 to disengage rotational force from the drive pulley 22 if the powered line courses 10, 30 encounter operating problems. This safety feature serves to prevent damage to the motor 20 or injury to an animal under problematic circumstances.

When the motorized unit housing 40 is in a closed configuration, a window 48 allows the lure 16 (not shown) to freely enter and exit the motorized unit housing 40. The drive pulley 22 is enclosed within a cover annular recess 52 and a base annular recess 54, best seen in the opened housing illustration of FIG. 4. When the motorized unit housing 40 is in a closed configuration, shown in FIG. 3, the height of the window 48, given by dimension "C" is larger than the height of opening 108 given by dimension "B," is large enough to allow the lure 16 to pass through window 48 without binding at the motorized unit housing 40. Opening 108 allows the line to pass around the drive pulley.

An upper portion of the width of the drive pulley 22 extends into the cover annular recess by an amount indicated by dimension "A." A lower portion of the width of the drive pulley 22 similarly extends into the base annular recess. The width of the drive pulley 22, which is approximately (2A+B), serves to ensure that the lure line 18, 38 cannot "ride up" from the inside "waist" of the pulley to the upper surface. This housing configuration thus allows the lure 16 to enter and exit the motorized unit housing 40, but prevents the lure line 18, 38 from slipping off the drive pulley 22 during normal use. In an exemplary embodiment, the outside diameter of the drive pulley 22 is approximately eight inches, and the diameter of the interior "waist" region is approximately seven inches.

When the motorized unit housing 40 is in a closed configuration, the cover 42 may be removably secured to the base 44 by a releasable mechanical fastener such as, for example, a hook-and-pile pair 56, 58 or other mechanical fastening configuration including, but not limited to, a latch, a thumbscrew, a friction-fit coupling; pin, or a combination thereof. The hook-and-pile pair 56, 58 may be secured to a cover standoff 62 and a base standoff 64 respectively, as shown in FIG. 4. The cover standoff 62 and the base standoff 64 are not shown in FIG. 3, for clarity of illustration. The heights of the cover standoff 62 and the base standoff 64 are selected to retain the housing cover 42 and the housing base 44 at the proper separation distance to provide the opening of the window 48. As shown in FIG. 4, a handle 68 may be provided for convenience in transporting the closed motorized pulley unit 12.

Figure 5:
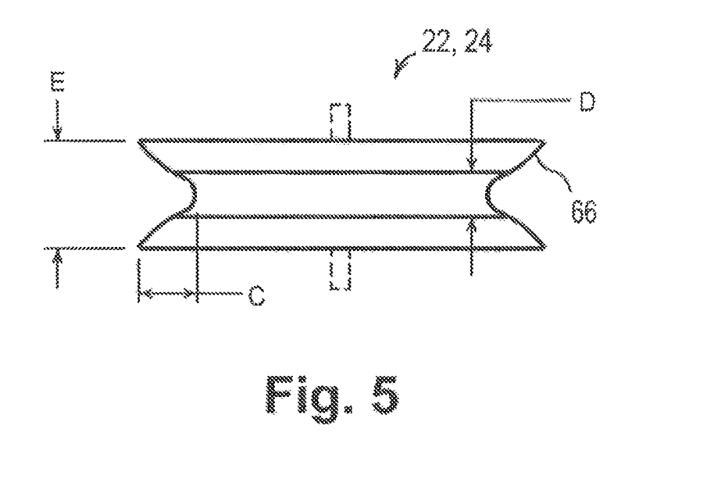
FIG. 5 is a side diagrammatical view of the pulley used in the motorized pulley unit and the transfer pulley unit of FIG. 1.

FIG. 5 shows the configurations of the drive pulley 22 and the transfer pulley 24. A bevel or curvature 66, ranging from about one inch radius to about six inch radius, is provided on the inner "waist" surface of the pulleys 22, 24 to prevent binding of the lure line 18, 38 (not shown) during normal operation of the powered line courses 10, 30. The radius of the drive pulley 22 and the transfer pulley 24 at the "waist" may be about 0.25 to one inch less than the outside radius, as indicated by dimension "C." The width of the "waist" region may be about 0.25 to about two inches, as indicated by dimension "D." The width (or thickness) of the drive pulley 22 and the transfer pulley 24 may be about one to two inches, as indicated by dimension "E."

Figure 6:
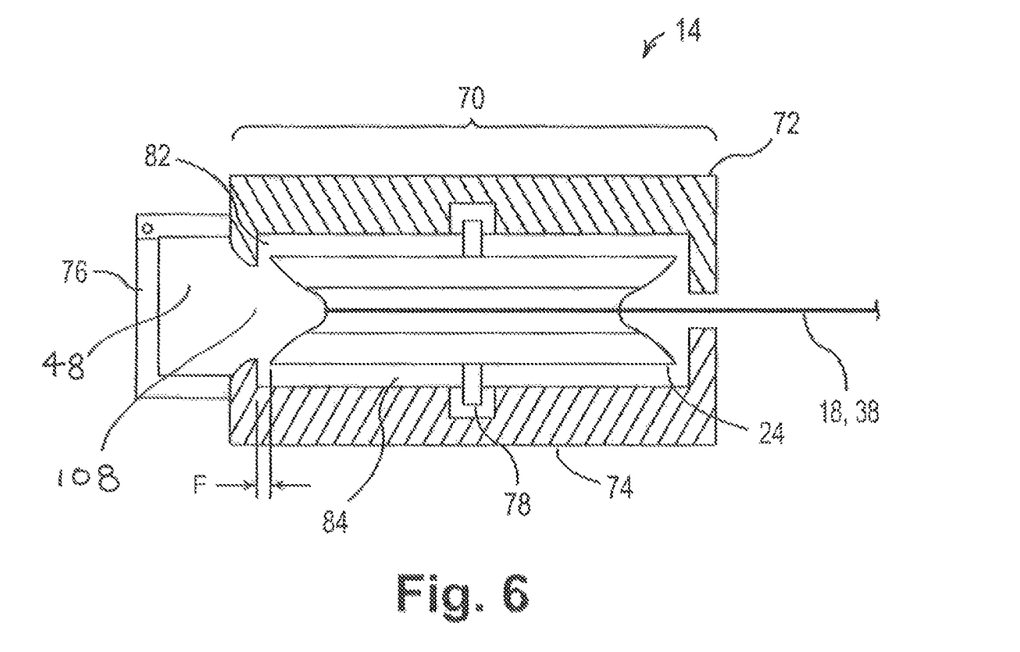
FIG. 6 is a cross-sectional diagrammatical view of the transfer pulley unit of FIG. 1 in a closed configuration.

FIG. 6 shows a cross-sectional view of the transfer pulley unit 14, as defined by section line 6-6 in FIG. 1. The transfer pulley unit 14 comprises the transfer pulley 24 retained in a transfer unit housing 70 by a support shaft 78. The transfer unit housing 70 includes a cover 72 hingedly connected to a base 74 by a hinge 76. The window 48 of the closed transfer pulley unit 14 is similar to the window 48 of the motorized unit housing 40, and functions to allow entry and exit of the lure 16. The transfer pulley unit 14 also includes the cover standoff 62 and the base standoff 64 (both shown in FIG. 7), but are not shown in FIG. 6, for clarity of illustration. Opening 108 allows the line to pass around the drive pulley.

As seen in the illustration, the diameters of the cover annular recess 82 and the base annular recess 84 are slightly larger than the diameter of the transfer pulley 24, as indicated by dimension "F." The interior space defined by "F" is kept as small as practical, in accordance with manufacturing tolerances, while providing adequate space to allow for the insertion and removal of the transfer pulley 24 when the transfer unit housing 70 is closed or opened. In an exemplary embodiment, the outside diameter of the transfer pulley 24 is approximately five inches, and the diameter of the interior "waist" region is approximately four inches.

Figure 7:
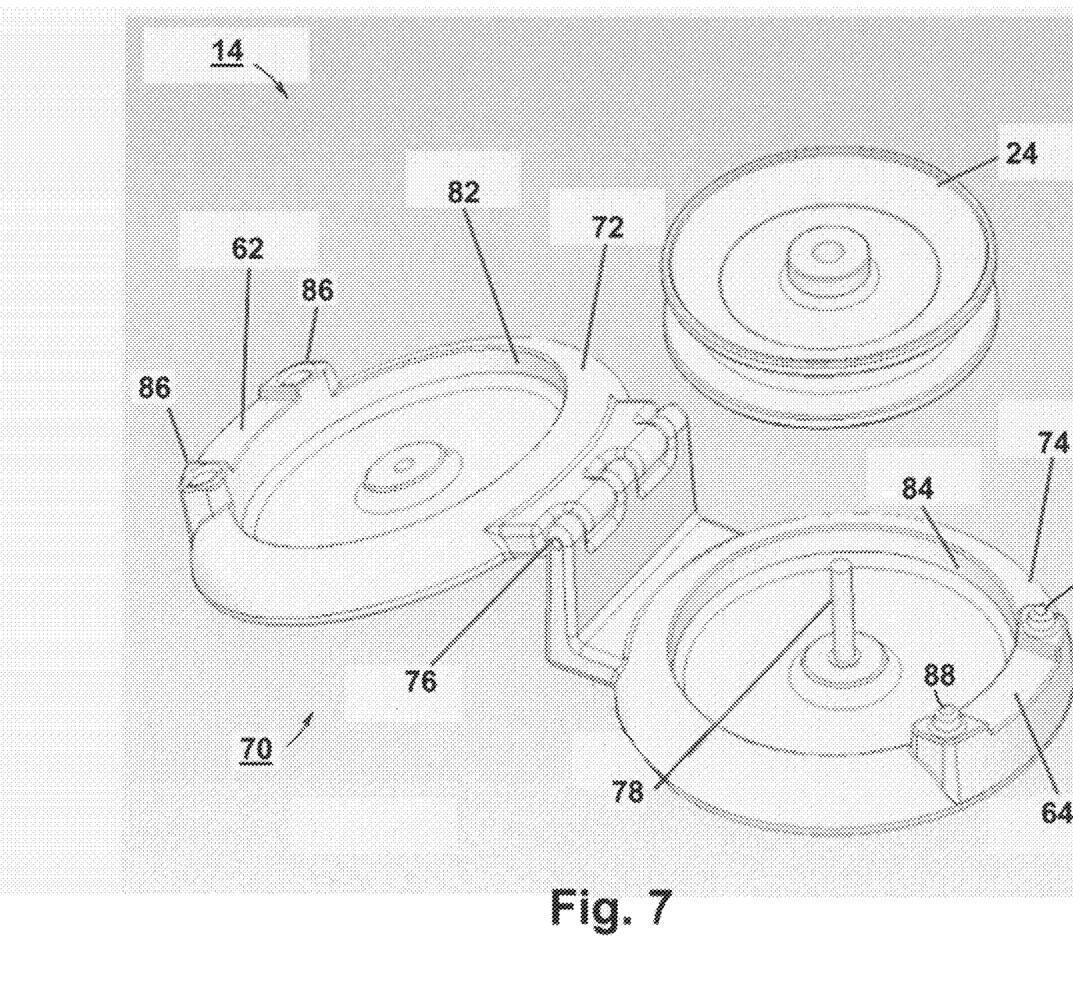
FIG. 7 is an exploded view of the transfer pulley unit of FIG. 1.

Referring now to FIG. 7, there is shown an exploded diagrammatical view of the transfer pulley unit 14, where the cover annular recess 82 and the base annular recess 84 for the transfer pulley 24 are more clearly shown. It should be understood that the cover annular recess 52 and the base annular recess 54 for the drive pulley 22, shown in FIG. 4, are similar in shape to the cover annular recess 72 and the base annular recess 84 for the transfer pulley 24, shown in FIGS. 6 and 7. However, to accommodate a larger drive pulley 22, the cover annular recess 52 and the base annular recess 54 for the drive pulley 22 may be larger in diameter than the cover annular recess 82 and the base annular recess 84 for the transfer pulley 24.

The transfer pulley unit 14 also includes the cover standoff 62 and the base standoff 64 located on the cover 72 and the base 74, respectively. In the exemplary embodiment shown, the cover standoff 62 includes a pair of sockets 86 sized and positioned to receive a corresponding pair of pins 88. The sockets 86 and pins 88 may be used as alternative mechanical fasteners to the hook-and-pile pair 56, 58 of FIG. 4, to provide means to releasably attach the cover 72 to the base 74. When the transfer pulley unit 14 is opened, as in FIG. 7, the transfer pulley 24 can be removed from the support shaft 78, as shown.

Figure 8:
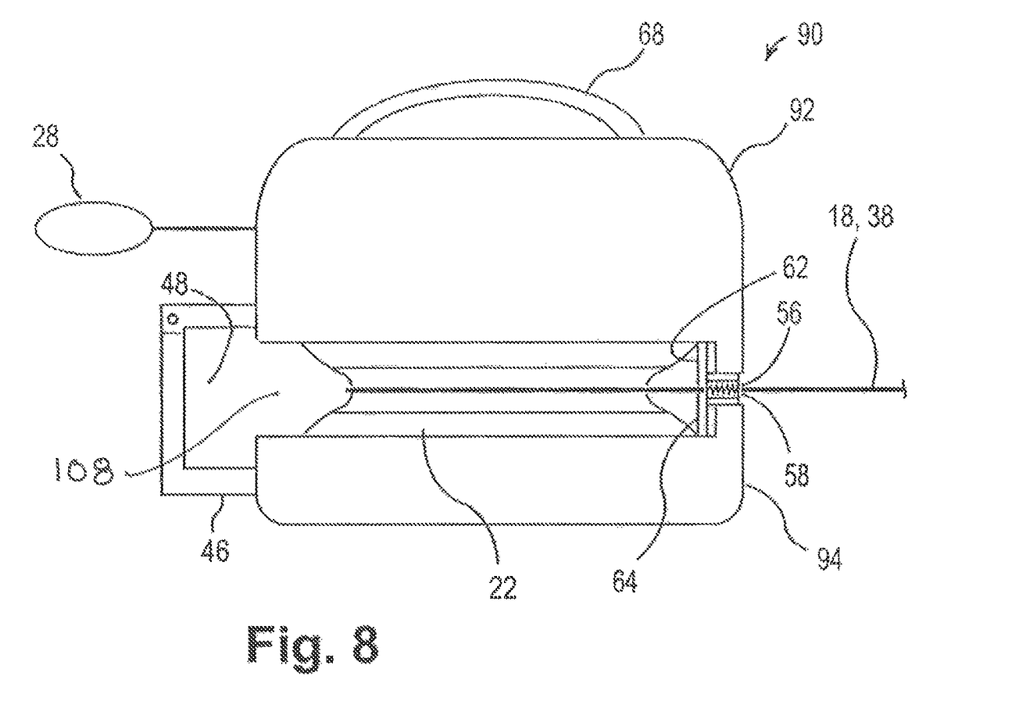
FIG. 8 is a diagrammatical side view of an embodiment of the motorized pulley unit of FIG. 1 in an opened configuration.

FIG. 8 shows an exemplary embodiment of a motorized pulley unit 90 in a closed configuration. The motorized pulley unit 90 includes a cover 92 with the handle 68, and a base 94. The hinge 46 secures the cover 92 to the base 94, and the hook-and-pile pair 56, 58 serve to keep the motorized pulley unit 90 in a closed configuration. The electrical speed and direction control 28 is electrically connected to a motor 20 (not shown) located inside the cover 92. This illustration clearly shown the window 48, having a height or opening which allows the lure 16 (not shown) to pass around the drive pulley 22 without interference from either the cover 92 or the base 94.

Figure 9:
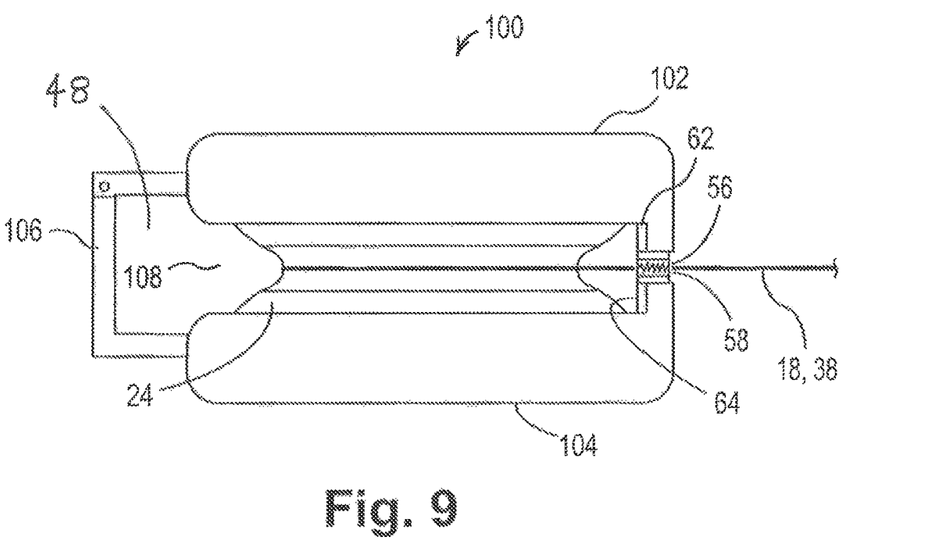
FIG. 9 is a diagrammatical side view of an embodiment of the transfer pulley unit of FIG. 1 in a closed configuration.

FIG. 9 shows an exemplary embodiment of a transfer pulley unit 100 in a closed configuration. The transfer pulley unit 100 includes a cover 102 secured with a hinge to a base 104. The hook-and-pile pair 56, 58 serve to keep the transfer pulley unit 100 in a closed configuration so as to protect the operator and lure-chasing animals from injury by the rotating transfer pulley 24. This illustration shows opening 108, having a height B as depicted in FIG. 3, which allows the lure line 18, 38 to freely pass around the transfer pulley 24 without interference from either the cover 102 or the base 104. Window 48 allows the lure 16 (not shown) to freely enter and exit the transfer unit housing.

It is to be understood that the description herein is only exemplary of the invention, and is intended to provide an overview for the understanding of the nature and character of the disclosed lure chasing systems. The accompanying drawings are included to provide a further understanding of various features and embodiments of the method and devices of the invention which, together with their description serve to explain the principles and operation of the invention. While a number of embodiments of the present invention have been shown and described herein in the present context, such embodiments are provided by way of example only, and not of limitation. Numerous variations, changes, and substitutions will occur to those of skill in the art without materially departing from the invention herein.

What is claimed is:

1. A lure chasing system comprising:
   a motorized pulley unit disposed at a first location, said motorized pulley unit including a drive housing enclosing a motor and a drive pulley connected to said motor;
   wherein said drive housing comprises a drive housing cover having a drive housing cover annular recess and a drive housing base having a drive housing base annular recess, and wherein said drive pulley is at least partially enclosed by said drive housing cover annular recess and said drive housing base annular recess;
   and wherein said drive pulley has a width, a first portion, and a second portion, and wherein said first portion extends into said drive housing cover annular recess, and wherein said second portion extends into said drive housing base annular recess;
   a transfer pulley unit disposed at a second location, said transfer pulley unit including a transfer housing enclosing a transfer pulley;
   wherein said transfer housing comprises a transfer housing cover having a transfer housing cover annular recess and a transfer housing base having a transfer housing base annular recess, and wherein said transfer pulley is at least partially enclosed by said transfer housing cover annular recess and said transfer housing base annular recess;

a lure line engaging said drive pulley and said transfer pulley so as to form a loop configuration for said lure line, said lure line able to loop continuously around said drive pulley and said transfer pulley; and a lure attached to said lure line;

wherein said drive housing cover and drive housing base comprise a drive window having a height when said drive housing is in a closed configuration, allowing said lure to pass through said drive window when said lure line is passing around said drive pulley; and wherein said drive housing cover comprises an arcuate surface and said drive housing base comprises an arcuate surface, said drive housing cover arcuate surface and said drive housing base arcuate surface together forming an opening having a height, and said arcuate surfaces guiding said lure line into said drive pulley and allowing passage of said lure line through said opening and around said drive pulley, said opening height having a smaller dimension than said drive pulley width;

wherein said drive window height is larger than said opening height.

2. The lure chasing system of claim 1 wherein said drive housing cover and said drive housing base are hingedly connected.

3. The lure chasing system of claim 2 wherein said drive housing further comprises a mechanical fastener to secure said drive housing cover against said drive housing base when said drive housing is in a closed state.

4. The lure chasing system of claim 3 wherein said mechanical fastener comprises one of a hook and pile fastener, a latch, a thumbscrew, or a friction-fit coupling pin.

5. The lure chasing system of claim 1 wherein said transfer housing cover is hingedly connected to said transfer housing base.

6. The lure chasing system of claim 5, wherein said transfer housing cover and transfer housing base are configured to form a transfer window having a height when said transfer housing is in a closed state, said transfer window being sized and configured so as to allow passage of said lure line and said lure through said transfer housing.

7. The lure chasing system of claim 6 wherein said transfer pulley comprises a thickness greater than the height of said transfer window.

8. The lure chasing system of claim 6 further comprising a mechanical fastener to secure said transfer housing cover against said housing transfer base when said transfer housing is in said closed state.

9. The lure chasing system of claim 8 wherein said mechanical fastener comprises one of a hook and pile fastener, a latch, a thumbscrew, or a friction-fit coupling pin.

10. The lure chasing system of claim 1, wherein said lure line is defined as being a plastic material having a melting point that causes said lure line to soften and break from heat generated from persistent slippage on an inner surface of either of said drive pulley or said transfer pulley.

11. A lure chasing system comprising:

a drive housing enclosing a motor and a drive pulley connected to said motor, said drive housing comprising a drive housing cover and a drive housing base, said drive housing cover secured to said drive housing base with a hinge and with a hook and pile fastener;

wherein said drive housing cover has a drive housing cover annular recess and said drive housing base has a drive housing base annular recess, and wherein said drive pulley is at least partially enclosed by said drive housing cover annular recess and said drive housing base annular recess;

and wherein said drive pulley has a width, a first portion, and a second portion, and wherein said first portion extends into said drive housing cover annular recess, and wherein said second portion extends into said drive housing base annular recess;

at least one transfer housing enclosing a transfer pulley, said at least one transfer housing comprising a transfer housing cover and a transfer housing base, said transfer housing cover secured to said transfer housing base with a hinge and with a hook and pile fastener;

wherein said transfer housing cover comprises a transfer housing cover annular recess and said transfer housing base comprises a transfer housing base annular recess, and wherein said transfer pulley is at least partially enclosed by said transfer housing cover annular recess and said transfer housing base annular recess;

a lure line engaging said drive pulley and said transfer pulley so as to form a loop configuration of said lure line, said lure line able to loop continuously around said drive pulley and said transfer pulley; and a lure attached to said lure line;

wherein said drive housing cover and drive housing base comprise a drive window having a height when said drive housing is in a closed configuration allowing said lure to pass through said drive window when said lure line is passing around said drive pulley; and wherein said drive housing cover comprises an arcuate surface and said drive housing base comprises an arcuate surface, said drive housing cover arcuate surface and said drive housing base arcuate surface together forming an opening having a height, and said arcuate surfaces guiding said lure line into said drive pulley and allowing passage of said lure line through said opening and around said drive pulley, said opening height having a smaller dimension than said drive pulley width;

wherein said drive window height is larger than said opening height.

12. The lure chasing system of claim 11, wherein said drive housing cover and drive housing base are configured to form a drive window having a height when said drive housing is in a closed state, said drive window being sized and configured so as to allow passage of said lure line and said lure through said drive housing.

13. The lure chasing system of claim 11 wherein said drive pulley comprises a thickness greater than the height of said drive window.

14. The lure chasing system of claim 11 wherein said lure line comprises stranded nylon string having a tensile strength of at least fifty pounds.

15. The lure chasing system of claim 11 further comprising an electrical speed and direction control connected to said motor.

16. The lure chasing system of claim 11 further comprising a clutch disposed between said motor and said drive pulley.

17. The lure chasing system of claim 11 wherein said at least one transfer housing having a transfer pulley is further defined as two transfer housings each having a transfer pulley.

18. The lure chasing system of claim 11 wherein said drive pulley comprises an outer diameter of approximately eight inches and each of said at least one transfer pulleys comprises an outer diameter of approximately five inches.

19. The lure chasing system of claim 11 wherein said drive pulley comprises an outer diameter of approximately eight inches and an inner waist diameter of approximately seven inches.

20. The lure chasing system of claim 11, wherein said lure line is defined as being a plastic material having a melting point that causes said lure line to soften and break from heat generated from persistent slippage on an inner surface of either of said drive pulley or said transfer pulley.

\* \* \* \* \*